(12) United States Patent
Woicke et al.

(10) Patent No.: US 11,738,291 B2
(45) Date of Patent: Aug. 29, 2023

(54) PROFILED STRIP AND METHOD OF FORMING A SEPARATING ASSEMBLY

(71) Applicant: ENEXIO WATER TECHNOLOGIES GmbH, Wettringen (DE)

(72) Inventors: Nina Woicke, Wettringen (DE); Ingo Neumann, Hamm (DE)

(73) Assignee: Enexio Water Technologies GmbH, Wettringen (DE)

( * ) Notice: Subject to any disclaimer, the term of this patent is extended or adjusted under 35 U.S.C. 154(b) by 137 days.

(21) Appl. No.: 17/599,158

(22) PCT Filed: Feb. 19, 2020

(86) PCT No.: PCT/DE2020/000031
§ 371 (c)(1),
(2) Date: Sep. 28, 2021

(87) PCT Pub. No.: WO2020/192810
PCT Pub. Date: Oct. 1, 2020

(65) Prior Publication Data
US 2022/0152530 A1 May 19, 2022

(30) Foreign Application Priority Data
Mar. 28, 2019 (DE) .................... 10 2019 002 240.8

(51) Int. Cl.
*B01D 21/02* (2006.01)
*B01D 21/00* (2006.01)
(52) U.S. Cl.
CPC ..... *B01D 21/0069* (2013.01); *B01D 21/0003* (2013.01); *B01D 21/0051* (2013.01)

(58) Field of Classification Search
CPC ............ B01D 17/0211; B01D 21/0003; B01D 21/0045; B01D 21/0051; B01D 21/0069
(Continued)

(56) References Cited

U.S. PATENT DOCUMENTS 4,122,017 A * 10/1978 Tanabe ............... B01D 21/0003
210/522
4,597,869 A * 7/1986 Hakansson ........ B01D 21/0069
210/521

(Continued)

FOREIGN PATENT DOCUMENTS

DE    3426571 A1    2/1985
DE    9202681 U1    7/1992
(Continued)

*Primary Examiner* — Joseph W Drodge
(74) *Attorney, Agent, or Firm* — Barclay Damon LLP

(57) ABSTRACT

A method of forming a honeycomb-shaped assembly comprises providing a plurality of profiled strips. Each of the profiled strips comprises two base sides positioned at an obtuse angle relative to each other to form a trough-shaped configuration. An inner projecting flange and an outer projecting flange extend from the base sides. One of the inner projecting flange and outer projecting flange comprises an groove. Two connecting sides each extend along a plane from one of the two base sides and each includes at least one free end including a projection. The plurality of profiled strips are stacked to form an octagonal honeycomb configuration by inserting the projection of a connecting side of one of the plurality of profiled strips into the groove of a base side of another of the plurality of profiled strips. At least a portion of the projection is received by the groove in an interlocking manner.

19 Claims, 4 Drawing Sheets

(58) Field of Classification Search
USPC .................................... 210/521, 522, 802
See application file for complete search history.

(56) References Cited

U.S. PATENT DOCUMENTS

| | | | |
|---|---|---|---|
| 2006/0261006 A1* | 11/2006 | Ursel | B01D 21/0051 210/521 |
| 2011/0233127 A1 | 9/2011 | Marggraff et al. | |
| 2015/0048030 A1* | 2/2015 | Barbier | B01D 21/0051 210/521 |

FOREIGN PATENT DOCUMENTS

| | | |
|---|---|---|
| DE | 102008038698 A1 | 2/2010 |
| EP | 0405169 A2 | 1/1991 |
| EP | 0559056 A1 | 9/1993 |

* cited by examiner

PROFILED STRIP AND METHOD OF FORMING A SEPARATING ASSEMBLY

CROSS REFERENCE TO RELATED APPLICATIONS

This application is a national stage application pursuant to 35 U.S.C. § 371 of International Application No. PCT/DE2020/00031, filed on Feb. 19, 2020, which claims priority to, and the benefit of, German Patent Application No. 10 2019 002 240.8, filed on Mar. 28, 2019. The entire contents of the above-referenced applications are incorporated herein by reference.

FIELD OF TECHNOLOGY

The present disclosure relates to a profiled strip for installing in honeycomb-shaped separating assemblies for settling basins, sedimentation systems and the like that has a trough-shaped configuration and two long base sides that form an obtuse angle relative to each other and each transition into a short connecting side while forming an obtuse angle.

BACKGROUND

Profiled strips are either assembled by the manufacturer itself or at the particular installation site into separating assemblies which are installed in corresponding wastewater treatment facilities. Such wastewater treatment facilities are generally settling basins, or respectively sedimentation systems that work by gravity sedimentation. In this context, the liquid mixture to be separated is guided through the honeycomb-shaped separating assembly, wherein laminar flow conditions arise that form the prerequisite for each sedimentation process Laminar flow conditions are enhanced by the closed channels of the honeycomb system. To ensure a reliable discharge of sludge, such separating assemblies are normally installed obliquely relative to the horizontal, for example at an angle of 60°.

Preferred areas of application are water treatment, water purification, secondary clarification in biological wastewater treatment plants, preliminary clarification of municipal wastewater, wastewater purifiers in industry, etc. . . .

A profiled strip of the initially described type is known from DE 10 2008 038 698 A1. The known profiled strip is designed such that a plurality of profiled strips can be stacked in each other, the assembled separating assembly is formed by octagonal honeycombs, and each honeycomb is formed by four profiled strips, and tongue-and-groove connecting sections are provided on the connecting sides and on the base sides for assembling the honeycomb-shaped separating assemblies, wherein a single groove-connecting section is arranged on the free ends of the connecting sides, and a single tongue connecting section is arranged on the ends of the base sides abutting the connecting sides, or vice versa. Each tongue-and-groove connecting section can also be provided with means for interlocking the groove and tongue.

The object of the present invention is to further develop such a profiled strip. In particular, the intent is to create a profiled strip of the aforementioned kind that can be assembled in a very easy manner into particularly robust separating assemblies.

BRIEF SUMMARY OF INVENTION

An embodiment of a profiled strip comprises a special connecting technique that allows the assembly of a plurality of profiled strips into a particularly robust separating assembly. This is achieved in that the free ends of the connecting sides are each designed as a tongue-and-groove connecting section lying more or less in the plane of the connecting sides, and a groove connecting section projecting from the plane of the base side is arranged on the outer side of the ends of the base sides abutting the connecting sides, wherein tongue-and-groove connecting sections of various profiles can be interlocked with each other by engaging a projection on the tongue connecting section into an undercut in the groove connecting section to form a locking connection.

The solution according to the invention substantially differs from the aforementioned prior art in that the profiled strip has a tongue connecting section that approximately lies in the connection plane, i.e., does not substantially project laterally from the connecting side, and necessarily forms a locking connection with the associated groove connecting section when assembled. To accomplish this, it possesses a projection that, upon insertion into the groove connecting section, hooks the undercut thereof and causes both parts to lock into one another.

In an embodiment, the tongue connecting section comprises a stop that comes into contact with the groove connecting section while established the locking connection. When assembling profiled strips, this stop forms a locking point in the locking process that abuts a component of the groove connecting section and, during assembly, introduces an additional degree of rigidity into the assembly.

In an embodiment, the tongue and/or groove connecting section comprises bevels to make it easier to engage the parts with each other during assembly.

In an embodiment, the locking connection ensures that no additional connecting means will be required, for example additional securing by adhesion, welding, etc.

In an embodiment, the groove connecting section is formed by two flange sections projecting outward from the base side and spaced one above the other, of which one is provided with the undercut. Especially, the undercut is provided in the inner side of the inner flange section.

The terms "inner" and "outer" used in this case mean the lateral distance from the midline of the profiled strip. Furthermore, "outwardly projecting" means a direction approximately parallel to the perpendicular midplane of the profiled strip.

In an embodiment, both flange sections form a groove between them in which the tongue of the tongue connecting section is inserted during assembly. In so doing, the projection provided on the tongue enters the region of the undercut of the groove flange and locks into place therein. The stop provided on the tongue connecting section then comes to rest on the flange end.

To facilitate the insertion of the tongue connecting section in the groove, the two flanges are provided with bevels.

In an embodiment, the flange sections of the groove connecting section are divided into individual tab sections. Given the division into individual tabs, individual locking connections arise at certain intervals, for example every 115.5 mm. In this embodiment, a continuous locking connection therefore does not exist.

In an embodiment, the tongue connecting section comprises locking hook sections extending parallel thereto that, during assembly, interact with open spaces between the tabs of the flange sections of the groove connecting section.

In an embodiment, the tongue connecting section comprises centering bumps that interact with centering grooves in the groove connecting section or vice versa to prevent assembled profiles from slipping in the longitudinal direction.

In an embodiment, the profiled strip includes a reinforcing rib along its midline to improve rigidity.

In an embodiment, the profiled strip is provided with reinforcing ribs on the outer surface of its base sides. Such an embodiment is recommendable for profiled strips that are arranged on the end of a separating assembly since very smooth adjacent surfaces are desirable for profiled strips in the interior of a separating assembly to enable a laminar flow.

In another embodiment, the profiled strip is configured for easy stackability. In this regard, the inner flange section of the groove connecting section is preferably beveled on its outer side, and the tongue connecting section is preferably beveled on its inner side so that the provided beveled surfaces of the one profiled strip can lie on the connecting surfaces of the other profiled strip while stacking.

In an embodiment, a honeycombed-shaped separating assembly is composed of a plurality of profiled strips of the above-described type in which the individual honeycombs are configured octagonally. In such a configuration, the eight sides are formed by the two base and the two connecting sides of a first profiled strip, the two connecting sides of a second and third profiled strip, and the two base sides of a fourth profiled strip in a parallel position relative to the first two base sides. Such a separating assembly is preferably arranged obliquely at an angle of inclination of 60°. In this case for example the bottom profiled strips of the separating assembly can possess a corresponding ribbing on the outer sides of their base sides to increase the rigidity of the structure.

Of course, the individual profiled strips of such a separating assembly can possess other connecting means in addition to the provided locking means which does not exclude the invention. These are however generally unnecessary since the provided interlocking ensures a sufficiently robust connection.

BRIEF DESCRIPTION OF THE DRAWINGS

The invention will be explained in detail below with reference to exemplary embodiments in conjunction with the drawing. In the drawings.

DETAILED DESCRIPTION OF THE INVENTION

Figure 1:
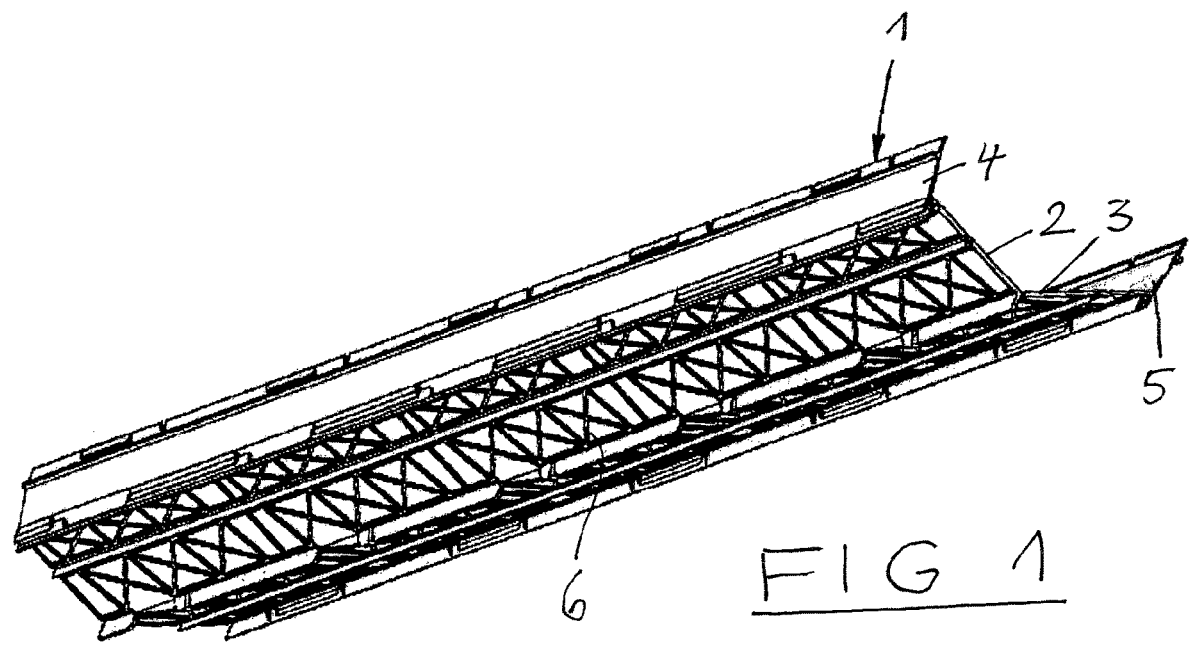
FIG. 1 illustrates a perspective view of an embodiment of a profiled strip including ribbing on the outer side of its two base sides to increase the rigidity.

The profiled strip 1 depicted in FIG. 1 possesses a trough shape and serves to be installed in honeycomb-shaped separating assemblies for settling basins, sedimentation systems and the like. It possesses two long base sides 2, 3 that form an obtuse angle with each other, and each transition into a short connecting side (4, 5) while forming an obtuse angle. The bottom side of the two base sides 2, 3 in the exemplary embodiment depicted here is provided with a ribbing 6 to increase the bending stiffness of the profiled strip. Moreover, the basic structure of the depicted profiled strip 1 corresponds to that of the prior art mentioned at the onset (DE 10 2008 038 698 A1).

Figure 2:
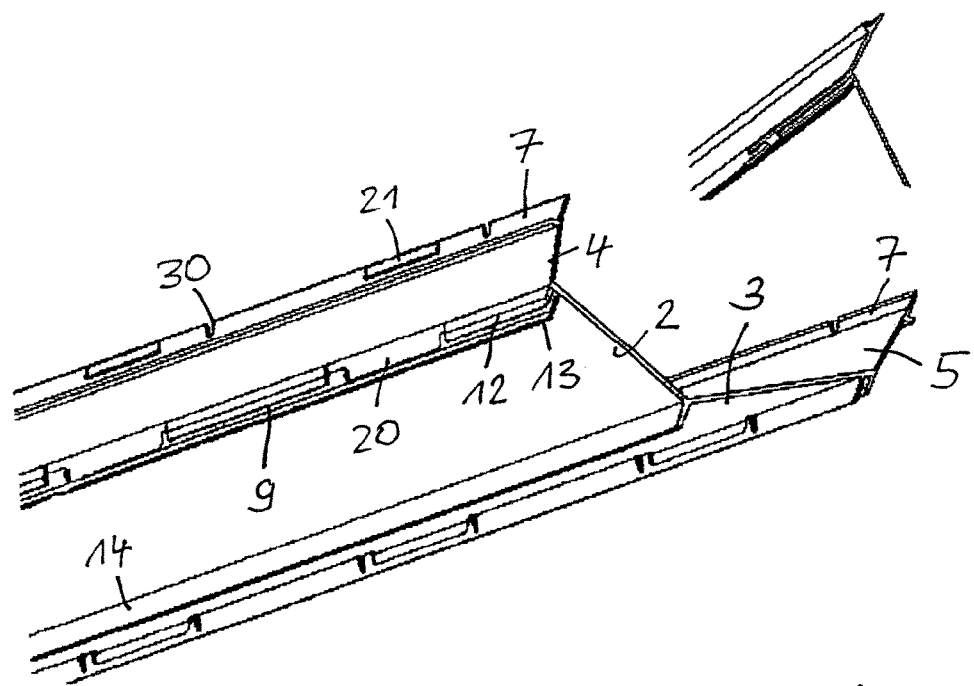
FIG. 2 illustrates a close-up view of a portion of another embodiment of a profiled strip in a detail view.

FIG. 2 shows a spatial view of a part of a profiled strip that corresponds to that from FIG. 1, wherein no ribbing is provided in this case. The trough-shaped configuration of the profiled strip with the two base sides 2, 3 and corresponding connecting sides 4, 5 can be seen. Tongue connecting sections 7 are provided on the free ends of the two connecting sides 4, 5 that more or less extend into the plane of the connecting sides 4, 5. At the transition points between the base sides 2, 3 and the connecting sides 4, 5 are groove connecting sections 9 that each have two flange sections 12, 13 projecting downward from the bottom side of the base sides 2, 3. Between themselves, both flange sections 12, 13 form a groove into which the tongue connecting section 7 is inserted where it interlocks while assembling a plurality of profiled strips.

The two adjacent flange sections 12, 13 forming the groove are divided into individual tabs in the longitudinal direction of the profiled strip between which corresponding open spaces 20 are located. Locking hooks 21 engage in these open spaces 20 while assembling profiled strips, and are arranged tab-shaped on the tongue connecting sections 7.

Figure 3:
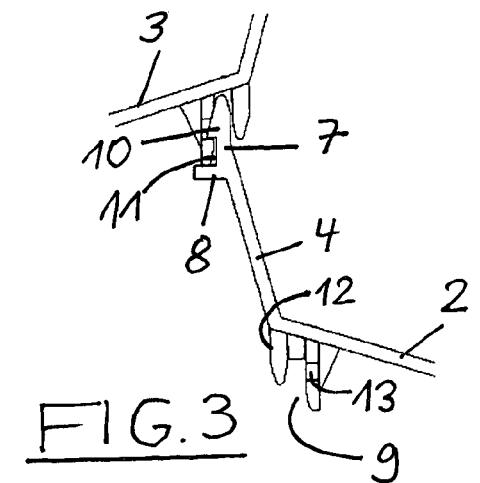
FIG. 3 illustrates an enlarged partial cross section view of an embodiment of a connecting point between two profiled strips.
Figure 4:
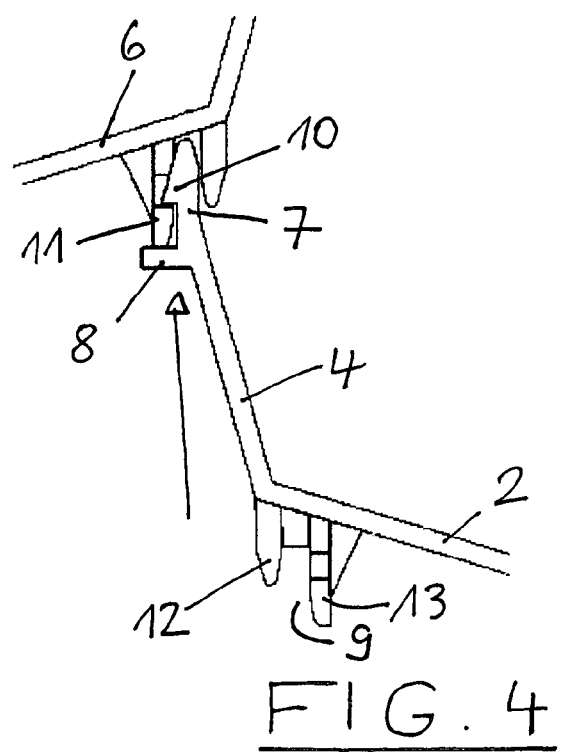
FIG. 4 illustrates an enlarged partial section of another embodiment of a connecting point between two profiled strips.

Enlarged representations of the connection between two profiled strips are shown in FIGS. 3 and 4. A bottom profiled strip that has a base side 2 and a connecting side 4 can be seen. While being assembled with a top profiled strip 6, the tongue connecting section 7 of the connecting side 4 is inserted into the groove of a groove connecting section 9, wherein the projection 10 provided on the tongue connecting section penetrates into the undercut 11 arranged in the groove connecting section 9 where it interlocks. A stop 8 also provided on the tongue connecting section 7 lies as a locking point against an inner flange section 13 of the groove connecting section 9 and furthermore has an outer flange section 12. The outer flange section 12 is shorter than the inner flange section 13. On their outer side, both flange sections extend more or less at a downward angle in the end region of the base side 2.

To prevent opposing profiled strips from slipping in their longitudinal direction, centering bumps (not shown) provided on the groove connecting section 9 engage in centering grooves provided in the tongue connecting section 7.

Figure 5:
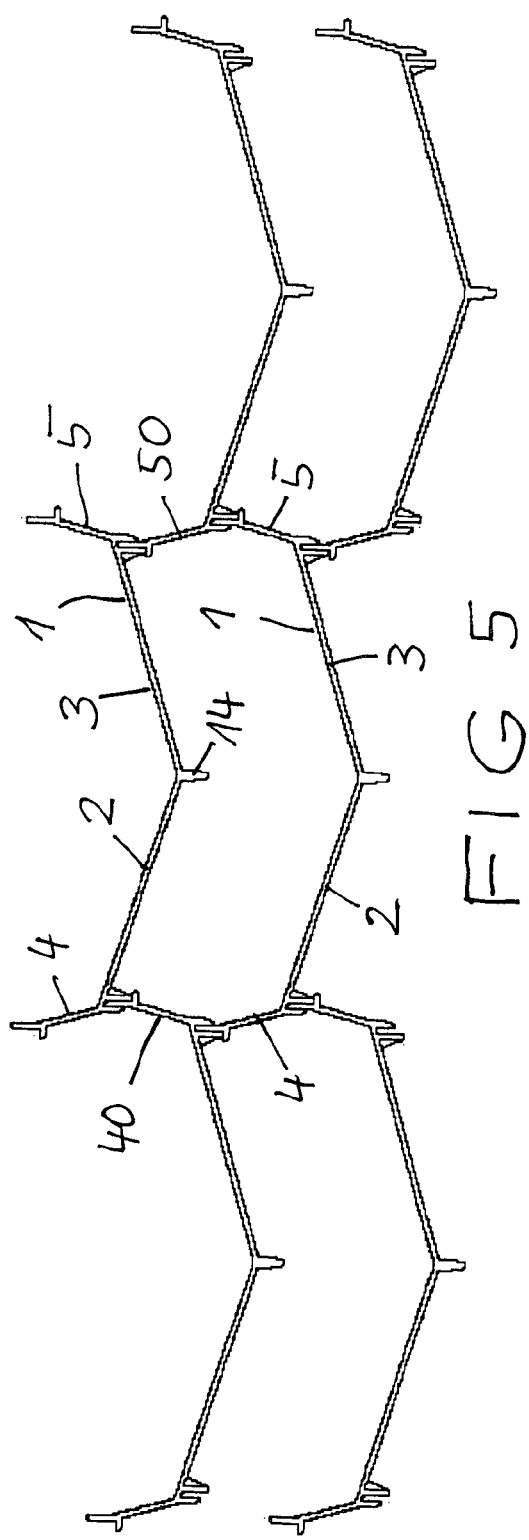
FIG. 5 illustrates a sectional view of a portion of an embodiment of a separating assembly comprising of a plurality of profiled strips.

FIG. 5 shows a vertical section of a separating assembly comprised of a plurality of profiled strips 1. It can be seen that, by assembling and connecting the profiled strips 1, octagonal and eight-sided hollow bodies arise that are each formed by the base sides 2, 3 of two opposing profiled strips, the connecting sides 4, 5 of the one profiled strip, as well as the connecting sides of two other profiled strips. To improve the bending stiffness, each profiled strip has a reinforcing rib 14 at its midline that extends outward.

Figure 6:
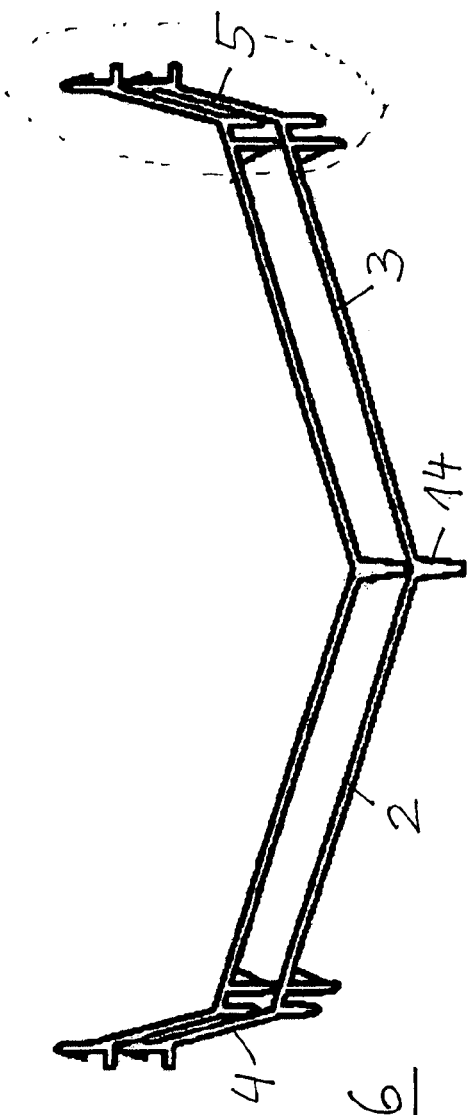
FIG. 6 illustrates a sectional view through two profiled strips in a stacked state.
Figure 7:
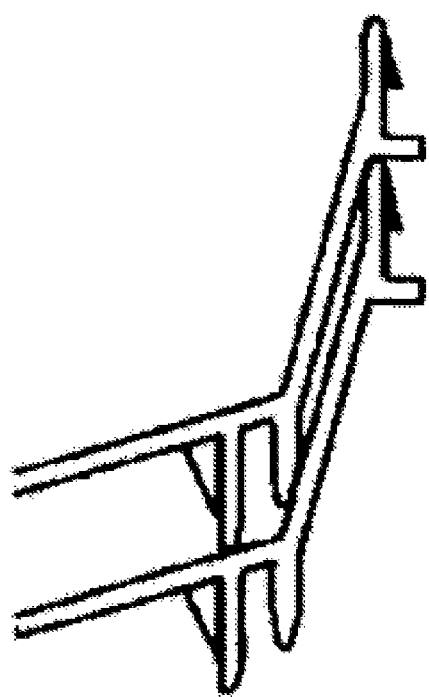
FIG. 7 illustrates an enlarged view of the embodiment of FIG. 6.

FIGS. 6 and 7 show a section of two stacked profiled strips 1 with their base sides 2, 3 and connecting sides 4, 5. As the figures show, the profiled strips can be easily stacked, and the outer flange 12 of the groove connecting section 9 and the end of the tongue connecting section 7 are beveled so that they can lie against the corresponding connecting sides while being stacked.

The invention claimed is:

1. A profiled strip for installing in honeycomb-shaped separating assemblies, the profiled strip comprising:
   two base sides extending longitudinally and positioned at an obtuse angle relative to each other to form a trough-shaped configuration, wherein each of the two base sides comprises an inner projecting flange and an outer projecting flange that are spaced apart from each other, wherein one of the inner projecting flange and outer projecting flange comprises an undercut groove; and
   two connecting sides each extending along a plane from one of the two base sides and each comprising at least one free end including a projection extending approximately along the plane of a corresponding connecting side, wherein each of the two connecting sides is positioned at an obtuse angle relative to a corresponding base side,
   wherein the trough-shaped configuration enables nesting of a plurality of stacked profiled strips.

2. The profiled strip according to claim 1, wherein the projection comprises a stop, wherein, when the projection of a connecting side is inserted between the inner projecting flange and the outer projecting flange of a base side of another profiled strip to establish a locking connection, the stop is configured to contact one of the inner and outer projecting flanges of the base side of the other profiled strip.

3. The profiled strip according to claim 2, wherein the undercut groove is located on an inner side of the inner projecting flange.

4. The profiled strip according to claim 2, wherein the inner projecting flange and the outer projecting flange are divided into tab sections.

5. The profiled strip according to claim 4, wherein the projections comprise locking hook sections configured to interact with open spaces between the tab sections of another profiled strip.

6. The profiled strip according to claim 2, wherein the projection comprises one or more surface features configured to interact with one or more complimentary surface features of the first and second projecting flanges to prevent connected profile strips from slipping relative to each other in a longitudinal direction.

7. The profiled strip according to claim 1, further comprising a reinforcing rib.

8. The profiled strip according to claim 1, further comprising a plurality of reinforcing ribs on an outer surface of each base side.

9. The profiled strip according to claim 1, wherein the outer projecting flange comprises a beveled outer side, wherein the projection comprises a bevel on an inner side of the projection.

10. A method of forming an honeycomb-shaped assembly comprising a plurality of profiled strips, the method comprising:
    providing a plurality of profiled strips, each of the plurality of profiled strips comprises,
      two base sides extending longitudinally and positioned at an obtuse angle relative to each other to form a trough-shaped configuration, wherein each of the two base sides comprises an inner projecting flange and an outer projecting flange that are spaced apart from each other, wherein one of the inner projecting flange and outer projecting flange comprises an undercut groove; and
      two connecting sides each extending along a plane from one of the two base sides and each comprising at least one free end including a projection extending approximately along the plane of a corresponding connecting side, wherein each of the two connecting sides is positioned at an obtuse angle relative to a corresponding base side; and
    stacking the plurality of profiled strips to form a honeycomb configuration by inserting the projection of a connecting side of one of the plurality of profiled strips into the groove of a base side of another of the plurality of profiled strips, wherein at least a portion of the projection is received by the undercut groove in an interlocking manner.

11. The method of claim 10, further comprising forming an octagonal honeycomb shape comprised of two base sides and two connecting sides of a first profiled strip, two connecting sides of a second and a third profiled strip, and the two base sides of a fourth profiled strip, wherein corresponding base sides of the first profiled strip and the fourth profiled strip are parallel.

12. The method according to claim 11, wherein the projection comprises one or more surface features configured to interact with one or more complimentary surface features of the first and second projecting flanges to prevent connected profile strips from slipping relative to each other in a longitudinal direction.

13. The method according to claim 10, wherein the projection comprises a stop, wherein, the insertion of the projection of a connecting side of one of the plurality of profiled strips into the groove of a base side of another of the plurality of profiled strips contacts the stop with one of the inner and outer projecting flanges of the base side of the other profiled strip.

14. The method according to claim 10, wherein the undercut groove is located on an inner side of the inner projecting flange.

15. The method according to claim 10, wherein the inner projecting flange and the outer projecting flange are divided into tab sections.

16. The method according to claim 15, wherein the projections comprise locking hook sections configured to interact with open spaces between the tab sections of another profiled strip.

17. The method according to claim 10, wherein each of the plurality of profiled strips further comprise a reinforcing rib.

18. The method according to claim 10, wherein each of the plurality of profiled strips comprises a plurality of reinforcing ribs on an outer surface of each base side.

19. The method according to claim 10, wherein the outer projecting flange of each profiled strip comprises a beveled outer side, and wherein the projection of each profiled strip comprises a bevel on an inner side of the projection.

* * * * *